United States Patent [19]

Gaskill et al.

[11] Patent Number: 5,169,160
[45] Date of Patent: Dec. 8, 1992

[54] LUBRICATING SEAL FOR PNEUMATIC CYLINDER

[75] Inventors: William Gaskill, Lisle; Robert J. Giovannetti, Berkely, both of Ill.; Thomas F. Stabosz, Jr., Celina, Ohio; Lido Boni, Des Plaines, Ill.

[73] Assignee: Parker Hannifin Corporation, Cleveland, Ohio

[21] Appl. No.: 800,676

[22] Filed: Nov. 27, 1991

[51] Int. Cl.⁵ .............................................. F16J 15/32
[52] U.S. Cl. ..................................... 277/68; 277/201; 277/206 A; 277/212 F
[58] Field of Search .................... 277/73, 75, 15, 59, 277/74, 135, 206 A, 201, 1, 68, 69, 103, 167.3, 177, 202, 205, 72 FM, 152, 212 R, 212 F

[56] References Cited

U.S. PATENT DOCUMENTS

| | | | |
|---|---|---|---|
| 869,536 | 10/1907 | Weber | 277/119 |
| 2,684,262 | 7/1954 | Neesen | 277/75 |
| 2,981,232 | 4/1961 | Peras | 277/201 |
| 3,033,578 | 5/1962 | Kellogg | 277/201 |
| 3,195,421 | 7/1965 | Rumsey et al. | 277/201 |
| 3,214,182 | 10/1965 | Herbruggen | 277/201 |
| 3,548,721 | 12/1970 | Eisenegger | 277/59 X |
| 3,642,293 | 2/1972 | Woodling | 277/206 A |
| 3,829,104 | 8/1974 | Green | 277/205 X |
| 3,829,106 | 8/1974 | Wheelock | 277/205 |
| 4,155,557 | 5/1979 | Grebert | 277/75 X |
| 4,284,280 | 8/1981 | Bertram et al. | 277/59 X |
| 4,305,592 | 12/1981 | Peterson | 277/59 |
| 4,337,956 | 7/1982 | Hopper | 277/59 X |
| 4,428,687 | 1/1984 | Zahradnik | 277/188 X |
| 4,877,257 | 10/1989 | Ide | 277/206 A |
| 5,088,745 | 2/1992 | Peppiatt et al. | 277/177 X |

FOREIGN PATENT DOCUMENTS

| | | | |
|---|---|---|---|
| 0104504 | 9/1983 | European Pat. Off. | 277/58 |
| 0083242 | 3/1895 | Fed. Rep. of Germany | 277/201 |
| 0884593 | 9/1953 | Fed. Rep. of Germany | 277/75 |
| 0850767 | 7/1959 | United Kingdom | 277/201 |

*Primary Examiner*—William A. Cuchlinski, Jr.
*Assistant Examiner*—James K. Folker
*Attorney, Agent, or Firm*—Ralph E. Jocke

[57] ABSTRACT

A lubricating seal construction for a pneumatic cylinder (10) includes a lubricating rod seal (40) and lubricating piston seals (27, 29). The rod seal includes a cavity (66) for holding a supply of viscous flowable lubricant. The piston seals include cavities (100) for holding the supply of similar lubricant. Passages (70) extend from the cavity in the rod seal to apertures (72) adjacent an outer surface (52) of a moveable piston rod (30). Passages (104) extend from the cavity in the piston seals to apertures (106) adjacent an inner surface (26) of the cylindrical chamber (24) inside the cylinder. The seals are made from resilient material and are filled with lubricant during assembly of the cylinder. As the cylinder is cycled, lubricant passes from the cavities as required to lubricate the seals and adjacent moving surfaces.

24 Claims, 3 Drawing Sheets

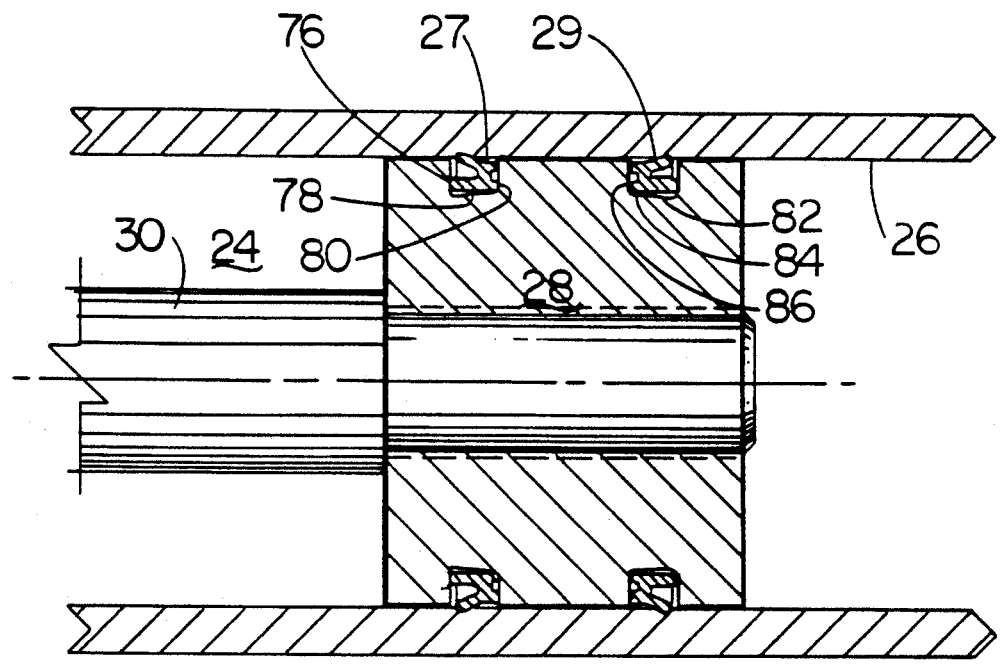
FIG. 5
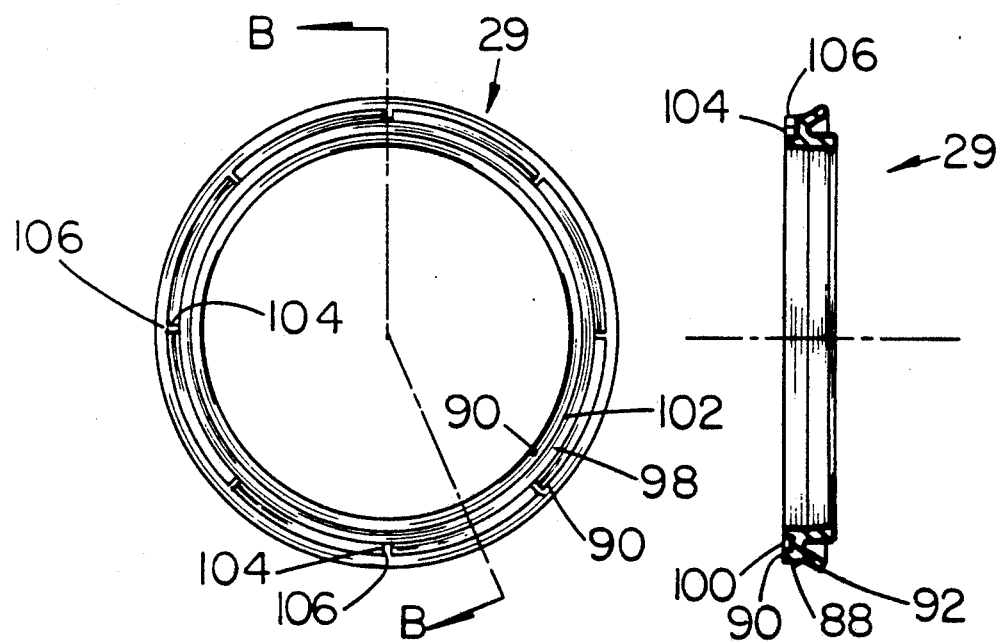
FIG 6
FIG 7

LUBRICATING SEAL FOR PNEUMATIC CYLINDER

TECHNICAL FIELD

This invention relates to fluid power cylinders. Specifically, this invention relates to a lubricating seal for movable piston and piston rod components in pneumatic cylinders.

BACKGROUND ART

Fluid power cylinders are well known in the prior art. Such cylinders typically include a body which encloses an elongated cylindrical chamber. A piston is housed within the chamber. The piston is moveable longitudinally in the chamber in response to fluid pressure which is selectively applied to the areas on the sides of the piston. A piston rod is attached to the piston and extends through an opening in the body. The piston rod is attached to a mechanism that is to be selectively moved.

Pneumatic fluid power cylinders operate through the selective application of compressed air to the areas on the sides of the piston. In pneumatic cylinders, resilient seals are typically provided, both on the piston and adjacent the opening through the body through which the piston rod extends. The seals on the piston prevent the escape of air pressure from one side of the piston to the other. The seal adjacent the opening through which the piston rod extends prevents the escape of air pressure from inside the cylinder to atmosphere.

The seals on the piston and the piston rod are dynamic seals that extend between surfaces that are relatively moveable. These seals may wear as the result of repeated cycling of the cylinder. Wear may be reduced by providing lubrication to the seals.

In the past, lubrication has been provided by applying grease or other lubricant to the seals and the other components when the cylinder is first assembled. While this is effective, after many cycles, the lubricant is worn off. Another approach has been to inject droplets of lubricant into the compressed air supplied to the cylinder. This is effective but is becoming less desirable because of the possible release of the lubricant to the environment. It is also inconvenient to maintain the apparatus that injects the lubricant and to keep it filled with lubricant.

Another approach to lubricating piston seals of a pneumatic cylinder has been developed by Lehigh Fluid Power, Inc. of Easton, Pennsylvania. This approach involves providing a reservoir for lubricant within the interior of the piston and using a wick to move the lubricant out of the reservoir and onto the inner wall of the chamber in which the piston is housed. The lubricant moves from the reservoir to the wall of the cylinder on the wick by capillary action. Lubricant applied to the inside wall of the chamber is transferred to the seals through movement of the piston.

The problem with this approach is that it requires the use of a specially designed piston which includes an internal reservoir and a wick. It also does not provide lubrication for the rod seal.

Another approach that has been taken by Peninsular, Inc. of Roseville, Michigan, and Hennells, Inc. of Ferndale, Michigan to extend seal life, has been to provide a lubricant reservoir both in the piston and adjacent the rod seal. Peninsular uses a wiping pad over the opening to the reservoirs to draw the lubricant out and slowly apply it onto an adjacent moving surface. Hennells slowly passes its lubricant out of the reservoirs through a ring with a series of small holes. The drawback associated with these approaches is that the cylinder housings and pistons must be specifically made to accommodate the reservoirs and the structures for depositing the lubricant on the moving surfaces. The inclusion of these added features may make the parts larger and may add cost to the products.

There is a very large population of pneumatic cylinders currently in use that do not include provisions for internal lubrication of the piston rod and piston seals. These pneumatic cylinders cannot be readily adapted to include such systems. Such pneumatic cylinders would benefit from an apparatus for self lubricating the seals as this would extend seal life and reduce the need for external lubrication.

Thus there exists a need for a system that provides lubrication to piston and rod seals in cylinders that do not have built in structures for internal lubrication. There further exists a need to provide lubrication for piston and rod seals to extend seal life.

DISCLOSURE OF INVENTION

It is an object of the present invention to provide a fluid power cylinder that automatically delivers lubrication to the piston and rod seals.

It is a further object of the present invention to provide a pneumatic cylinder that automatically delivers lubrication to the piston and rod seals.

It is a further object of the present invention to provide a pneumatic cylinder that delivers lubricant to the piston and rod seals in a manner that is reliable and that is low in cost.

It is a further object of the present invention to provide a lubricating seal that can be used in previously manufactured pneumatic cylinders of conventional construction.

It is a further object of the present invention to provide a lubricating seal that dispenses lubricant in only the amount needed responsive to cycling of the pneumatic cylinder.

It is a further object of the present invention to provide a lubricating seal that is reliable and economical.

Further objects of the present invention will be made apparent in the following Best Modes for Carrying Out Invention and the appended claims.

The foregoing objects are accomplished in the preferred embodiment of the invention by a fluid power cylinder having a body with an internal cylindrical chamber. A moveable piston is mounted in the chamber. A piston rod is attached to the piston and extends outward from the body. The piston includes a pair of spaced piston seals which extend between the piston and the inner wall of the chamber. The rod seal extends between the body and the piston rod in the opening through which the rod passes.

The rod seal is positioned in a cylindrical recess in the body adjacent the opening. The recess is rectangular in cross section and has a first surface disposed from and parallel to the outer surface of the piston rod. The recess also has a supporting surface extending normal to the rod surface and adjacent the exterior of the body.

The rod seal is positioned in the recess. It is comprised of resilient material. In cross section, the rod seal has a heel portion, the heel portion having a base surface in abutting relation of the supporting surface of the recess. The rod seal also has in cross section, a first lip portion extending from the heel portion to the outer surface of the piston rod. The rod seal also has in cross section, a second lip portion that extends from the heel portion and abuts the first surface of the recess.

The rod seal also includes cavity means for holding a supply of lubricant. The cavity means includes a circumferential grease cavity extending around the seal, the grease cavity being rectangular in cross section. The grease cavity has an opening that extends circumferentially in the base surface of the seal. A plurality of radially extending fluid passage means extend from the grease cavity to apertures which open adjacent the piston rod surface. The fluid passage means are open along one side of the base surface. The open side of the passages abuts the supporting surface of the recess.

When the cylinder is assembled, the cavity means is filled with flowable viscous lubricant. When the cylinder is assembled and cycled, the rod seal is deformed slightly due to the forces applied by friction and fluid pressure. As the resilient seal is deformed, a small amount of lubricant is pushed out of the cavity through the passages and onto the rod surface to provide lubrication. When friction is reduced, the deformation of the seal is correspondingly reduced and the amount of lubricant deposited on the rod is small. The converse is also true. As a result, the seal is self regulating.

In the preferred form of the invention, the piston is provided with a pair of seals positioned in spaced recesses which are also self-lubricating. Each of the piston seals includes cavity means and fluid passages for holding and delivering lubricant onto the inner wall of the chamber. The piston seals incorporate the same principles as the rod seal previously described. The piston seals deliver lubricant in the amount necessary to minimize seal wear and extend seal life.

BRIEF DESCRIPTION OF DRAWINGS

FIG. 5 is a sectional view of the piston and lubricating piston seals.

FIG. 6 is a plan view of the lubricating piston seal.

FIG. 7 is a sectional view of the piston seal along line B—B in FIG. 6.

BEST MODES FOR CARRYING OUT INVENTION

Figure 1:
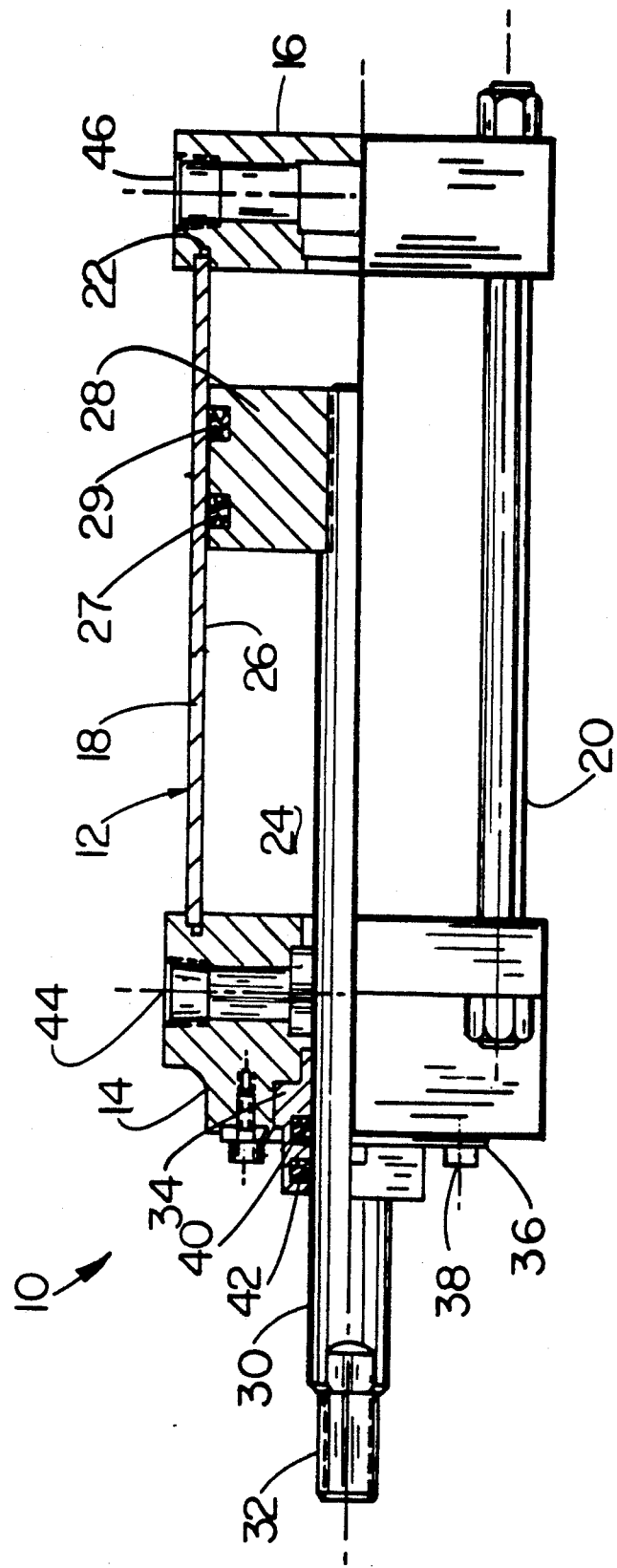
FIG. 1 is a partially sectioned view of a pneumatic cylinder including the lubricating seals of the preferred embodiment of the present invention.

Referring now to the drawings and particularly to FIG. 1, there is shown therein a partially sectioned view of a pneumatic cylinder, generally indicated 10. The cylinder, which is of a conventional construction except for the rod and piston seals, has a body 12 which includes a first end cap 14 and a second end cap 16. A cylindrical body section 18 extends between the end caps. The end caps and cylindrical body section are held together using a plurality of tie rod bolts 20, only one of which is shown. Static seals 22 are provided to prevent the escape of compressed air between the cylindrical body section 18 and the end caps.

Cylinder 10 has an internal cylindrical chamber 24. Chamber 24 is bounded by an inner wall surface 26 of the cylindrical body section 18. A piston 28 is mounted for movement in chamber 24. Piston 28 has a first seal 27 and a second seal 29 mounted thereon which extend between the outer wall surface of the piston and inner wall surface 26. Piston 28 is attached to a piston rod 30 which extends through first end cap 14 to the outside of the cylinder. Piston rod 30 includes a threaded outside end 32 to facilitate attachment of the rod to a mechanism to be moved by the cylinder.

Piston rod 30 is journalled in a gland 34 at the outer portion of end cap 14. Gland 34 is held in end cap 14 by a retainer 36 and fasteners 38. Gland 34 houses a rod seal 40 and piston rod wiper seal 42. Rod seal 40 serves to prevent the escape of compressed air from the inside of the cylinder around the cylinder rod. Wiper seal 42 serves to prevent the introduction of impurities into the interior of the cylinder.

End cap 14 includes first fluid port 44 which is in fluid communication with chamber 24 through a passage in the end cap of the cylinder. Second end cap 16 has a second fluid port 46 which is in fluid communication through a passageway in the end cap to chamber 24 on the opposite side of piston 28. In a manner well known to those skilled in the art, fluid pressure may be selectively applied and exhausted from ports 44 and 46 to move piston 28 longitudinally inside the cylinder. The movement of piston 28 is used to achieve the desired movement of piston rod 30 and an attached mechanism. It will be further understood by those skilled in the art that provisions may be made for cushioning the travel of piston 28 at the ends of its stroke by using cushioned ends. Cushioned ends have not been shown in the drawing for simplicity and to aid in understanding.

Figure 2:
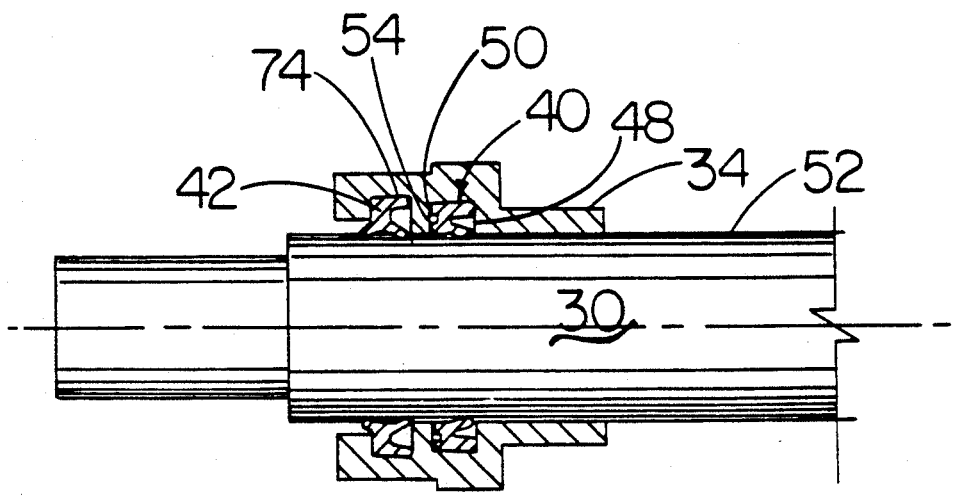
FIG. 2 is a sectional view of a cylinder rod wiper seal and lubricating seal for the rod.
Figure 3:
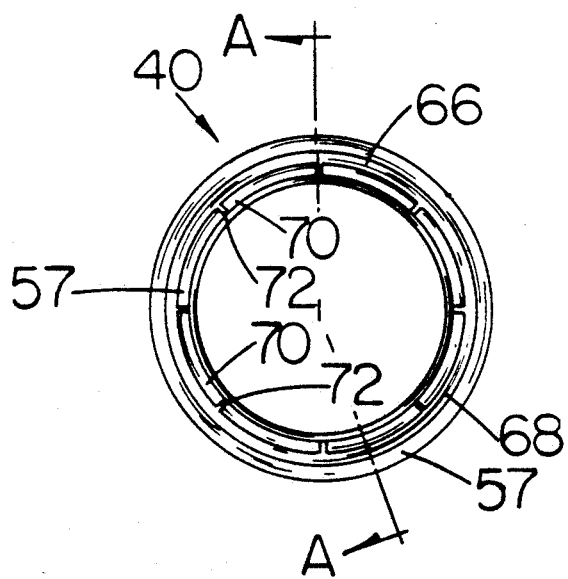
FIG. 3 is a plan view of the rod seal.
Figure 4:
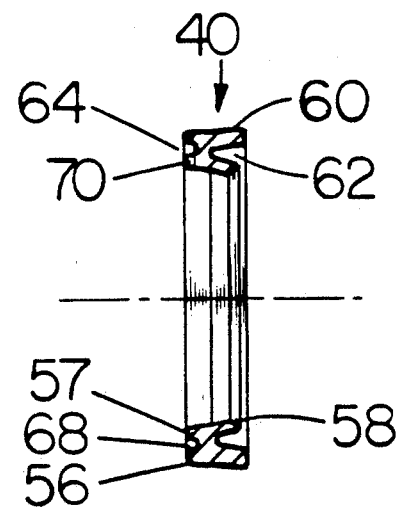
FIG. 4 is a sectional view of the rod seal along line A—A in FIG. 3.

Rod seal 40 is shown in greater detail in FIGS. 2 through 4. Rod seal 40 is mounted in a recess 48 in gland 34. Recess 48 has a first surface 50 which is disposed from and parallel to an outer surface 52 of piston rod 30. A supporting surface 54 extends normal to first surface 50 and rod surface 52. Supporting surface 54 is adjacent the outside of the cylinder and extends radially inward to a point that is only slightly disposed from rod surface 52.

Rod seal 40 is shown in the uncompressed condition in FIGS. 3 and 4. Rod seal 40 has a body comprised of resilient material. The body includes a heel portion 56 which is bounded by a base surface 57 that abuts supporting surface 54 when the seal is installed in the recess. Seal 40 also has a first lip portion 58 that extends radially inward and at an acute angle from the heel portion 56. First lip portion 58 extends into contact with rod surface 52 when the seal is installed in the cylinder. The rod seal 40 also includes a second lip portion 60 which abuts first surface 50 when the seal is installed in the recess. A triangular cut out 62 in cross section, is formed between the first and second lip portions of the seal body. When the seal is installed in the recess, the triangular cut out extends toward an area of high fluid pressure. The seal is installed this way so that the pressure will deform the resilient body to spread the lip portions and aid in sealing.

Cavity means 64 for holding lubricant is provided in rod seal 40. Cavity means 64 includes a circumferentially extending grease cavity 66 that is rectangular in cross section. Grease cavity 66 extends the full circumference of the seal around heel portion 56. Grease cavity 66 is open to supporting surface 64 through a ring shaped first opening 68 in base surface 57. A plurality of passages 70 extend radially inward from grease cavity 66. Each of passages 70 terminate inboard on the seal at an aperture 72. Each of passages 70 is open to the supporting surface 54 through base surface 57 when the seal is installed in the recess 48. Passages 70 and aperture 72 serve as fluid passage means for passing lubricant from grease cavity 66 to the inboard area of the seal. In the preferred form of the invention, eight passages are provided. However, in other embodiments more or less may be lo provided depending on the size and type of seal and the lubricant used.

Rod wiper seal 42 is positioned in a recess 74 in gland 34. Wiper seal 42 serves to prevent dirt and contamination from reaching rod seal 40 and the interior of the cylinder. Wiper seal 42 is of conventional construction.

First and second piston seals 27, 29 respectively are shown in greater detail in FIGS. 5 through 7. First piston seal 27 is mounted in a first piston recess 76. First recess 76 has a recess surface 78 which is disposed from and extends parallel to inner wall surface 26 of the chamber. Recess 76 also includes a supporting surface 80 which extends normal to surfaces 78 and 26.

Second piston seal 29 is positioned in a second piston recess 82. Recess 82 has a recess surface 84 disposed from and parallel to inner surface 26 of the chamber. Second recess 82 also has a supporting surface 86 which extends normal to surfaces 84 and 26. Supporting surface 86 of second piston recess 82, faces in the opposite direction from supporting surface 80 of the first piston recess 76. This is because seals 27 and 29 face in opposed directions as shown. Seal 29 prevents the passage of compressed air across piston 28 from right to left as shown in FIG. 5 while seal 27 prevents the passage of air from left to right.

Piston seals 27 and 29 in the preferred embodiment are identical except that they are mounted in opposed fashion. For this reason, only piston seal 29 is described in detail in FIGS. 6 and 7.

Piston seal 29 is shown in the uncompressed condition in FIGS. 6 and 7 prior to installation in piston recess 82. Seal 29 has a resilient body with a heel portion 88 which is bounded by a base surface 90 which abuts supporting surface 86 when the seal is installed in the recess. A first lip portion 92 extends radially outward from the heel portion at an acute angle and contacts inner wall surface 26 of the chamber. A second lip portion 94 extends from heel portion 88 and abuts recess surface 84 when the seal is installed. A triangular cut out 96 is formed between the lip portions of the seal and the seal is installed with the wide end of triangular cut out toward the area of high pressure to be sealed.

A cavity means 98 for lubricant is formed in seal 29. Cavity means 98 includes a grease cavity 100, which is rectangular in cross section and extends the full circumference of the seal. Grease cavity 100 is open to supporting surface 86 through a ring shaped opening 102 when the seal is installed. Ring shaped opening 102 extends circumferentially about base surface 90.

A plurality of radially extending passages 104 extend outward from grease cavity 100. Passages 104 each terminate at an aperture 106 on the outboard side of the seal. Passages 104 are open on the side adjacent supporting surface 86 so that when the seal is installed, the openings in the passages abut supporting surface 86. Passages 104 and apertures 106 serve as fluid passage means for passing lubricant from grease cavity 100 to the outboard side of the seal and onto the inner wall surface 26 of the cylinder.

When the cylinder is first assembled, the grease cavities of the first and second piston seals 27, 29 and rod seal 40 are packed with a viscous flowable lubricant. The other portions of the cylinder are lubricated during assembly in a conventional manner. After the cylinder has been placed in operation for a period of time, the lubricant originally applied wears off the first lip portions 92, 58 of the piston and rod seals. As this occurs, friction at the first lip portions rises as the seals move across the inner wall 26 of the chamber and the outer surface 52 of the rod 30 respectively. As friction at the lip portions rises, deformation of the resilient bodies of the seals occurs.

Deformation of the seal bodies tends to push the grease cavities of the seals 66, 100 and the passages that extend therefrom 70, 104, against the supporting surfaces. When this occurs, lubricant is moved from the cavity through the passages and onto the outside of the seal to again reduce friction. As the friction falls, deformation of the seal is reduced and the delivery of lubricant through the apertures subsides. The lubricating seals are thus self regulating in the delivery of lubricant.

The design of the seal also provides for the delivery of lubricant through the apertures 72, 106 in close proximity to the relatively moving surfaces. This facilitates regulation of the flow out of the apertures and prevents excessive flows. The preferred construction of the present invention with the cavities and passages open to the supporting surfaces, also serves to prevent the passages and cavities from becoming suction bound which might prevent the delivery of lubricant.

In the preferred form of the invention, the seals are made from rubber material of approximately 80 durometer. The apertures in the rod and piston seals range from 0.010 to 0.060 inches in width depending on the seal size. Applicant has found that the lubricating seal of the preferred embodiment of the present invention works well with grease having a viscosity of 900 SSU at 110° F. However, in other embodiments, other types of lubricant may be used.

Lubricating seals incorporating the present invention may be made to fit in the recesses of conventional cylinders which have been manufactured for years and which do not include provisions for internal lubrication. The use of the seals of the present invention enables elimination or a substantial reduction of the amount of lubricant that must be delivered through the air supply to the cylinder while still providing excellent seal life.

Thus the new lubricating seal of the present invention achieves the above stated objectives, eliminates difficulties encountered in the use of prior devices, solves problems and obtains the desirable results described herein.

In the foregoing description, certain terms have been used for brevity, clarity and understanding, however, no unnecessary limitations are to be implied therefrom because such terms are for descriptive purposes and are intended to be broadly construed. Moreover, the descriptions and illustrations are by way of examples and the invention is not limited to the details shown and described.

Having described the features, discoveries and principles of the invention, the manner in which it is constructed and operated and the advantages and useful results obtained, the new and useful structures, devices, elements, arrangements, parts, combinations, systems, equipment, operations and relationships are set forth in the appended claims.

We claim:

1. A lubricating seal for preventing the flow of fluid between a first surface and a second surface, said second surface movable relative to said first surface alternatively in a first direction and in an opposed direction, said seal separating an area of high fluid pressure from an area of low fluid pressure, said seal supported on a supporting surface extending generally traverse of said first and second surfaces;

said seal having a resilient body comprising in cross section:
a heel portion, said heel portion abutting said supporting surface;
cavity means adjacent said heel portion for housing a viscous, flowable lubricating material; and
fluid passage means enabling the flow of said lubricating material therethrough, said fluid passage means extending from said cavity means to an aperture adjacent said second surface, and
said seal further including a supply of said viscous, flowable lubricating material in said cavity means, and wherein said resilient body of said seal deforms upon movement of said second surface, whereby lubricating material is delivered through said fluid passage means to said aperture.

2. The lubricating seal according to claim 1 wherein said body is generally ring-shaped and said cavity means is arcuate in shape.

3. The lubricating seal according to claim 2 wherein said fluid passage means includes a plurality of passages extending in a radial direction from said cavity means to a plurality of apertures.

4. The lubricating seal according to claim 3 wherein said body includes a first opening adjacent said supporting surface, said first opening in fluid communication with said cavity means.

5. The lubricating seal according to claim 4 wherein said cavity means is a ring-shaped cavity extending circumferentially about said body, said heel portion includes a base surface in abutting flush relation with said supporting surface, and said first opening extends circumferentially in said base surface of said body.

6. The lubricating seal according to claim 5 wherein said radially extending passages include second openings adjacent said supporting surface.

7. The lubricating seal according to claim 6 wherein said second openings extend through said base surface along a length of said passages.

8. The lubricating seal according to claim 7 wherein said seal comprises at least four (4) fluid passage equally spaced about said circumference of said seal.

9. The lubricating seal according to claim 8 wherein said seal further comprises in cross section:
a first lip portion extending from said heel portion to said second surface; and
a generally triangular shaped cut-out in said seal body, a base of said triangular cut-out open toward said area of high fluid pressure.

10. The lubricating seal according to claim 9 wherein said first lip portion extends at an acute angle relative to said base surface of said heel.

11. The lubricating seal according to claim 10 wherein said seal body further comprises a second lip portion extending from said heel portion to said first surface.

12. The lubricating seal according to claim 11 wherein said second lip portion extends generally parallel of said first surface and said second lip portion includes a first side in abutting relation of said first surface.

13. The lubricating seal according to claim 12 wherein said seal body is comprised of resilient rubber material having hardness of about 80 durometer.

14. The lubricating seal according to claim 13 wherein said lubricating material is grease having a viscosity of 900 SSU at 100° F. and said apertures range from about 0.010" to 0.060" in width.

15. A pneumatic fluid power cylinder of a type including:
a cylindrical chamber bounded by a first inner wall; and
a piston movable in a longitudinal direction in said chamber said piston separating a first side of said chamber from a second side of said chamber and moveable therein responsive to fluid pressure selectively delivered to said first side and said second side; and
seal means extending between said first inner wall of said chamber and said piston for preventing the passage of fluid from said first side to said second side; and
wherein said piston includes a seal supporting surface extending generally traverse of said longitudinal direction;
wherein an improvement comprises:
said seal means comprising a lubricating seal having a resilient body comprising in cross section;
a heel portion abutting said supporting surface;
cavity means adjacent said heel portion adapted for housing a flowable viscous lubricant material; and
fluid passage mans for enabling the flow of said lubricant material therethrough, said fluid passage means extending from said cavity means to at least one aperture adjacent said first inner wall, and
a supply of said flowable viscous lubricant material in said cavity means, and wherein said resilient body of said seal deforms upon movement of said piston, whereby lubricant material is delivered through said fluid passage means to said aperture.

16. A pneumatic fluid power cylinder of a type including:
a cylindrical chamber housed in a body;
a piston longitudinally moveable in said chamber;
a rod attached to said piston and moveable therewith, said rod extending to the outside of said body through an opening in said body said body including a seal supporting surface extending traverse of said longitudinal direction;
rod seal means extending around said rod in said opening for preventing the passage of fluid through said opening
wherein an improvement comprises;
said rod seal means comprising a lubricating seal having a resilient body comprising in cross section;
a heel portion abutting said supporting surface;
cavity means adjacent said heel portion adapted for housing a flowable viscous lubricant material; and
fluid passage means for enabling the flow of said lubricant material therethrough, said fluid passage means extending from said cavity means to at least one aperture adjacent said rod, and a supply of said flowable viscous lubricant material in said cavity means, and wherein said resilient body of said seal deforms upon movement of said rod, whereby lubricant material is delivered through said fluid passage means to said aperture.

17. A lubricating seal for preventing the flow of fluid between a first generally cylindrical surface, and a second generally cylindrical surface, coaxial with said first surface, said second surface axially moveable relative to said first surface in a first direction and in an opposed direction, said seal separating an area of high fluid pressure from an area of low fluid pressure, said seal supported on a supporting surface extending in a radial direction and generally traverse of said first and second surfaces;

said seal being generally ring shaped and having a resilient body, comprising in cross section:

a heel portion, said heel portion having a base surface in abutting relation of said supporting surface;

a first lip portion extending from said heel portion at an acute angle, said first lip portion engaging said second surface;

a generally triangular shaped cut-out in said body, a base of said triangular cut-out open toward said area of high fluid pressure;

an internal cavity extending arcuately within said body, said cavity adapted for holding a viscous, flowable lubricant; said heel portion including a first opening extending arcuately in said base surface, said first opening in fluid communication with said cavity;

a plurality of fluid passages in fluid communication with said cavity and extending in the radial direction therefrom, each passage including an aperture adjacent said second surface, each said fluid passage including a second opening through said base surface, said second opening extending through said base surface along a length of said passage.

18. The lubricating seal according to claim 17 wherein said internal cavity extends circumferentially about said body, and said first opening extends circumferentially in said base surface.

19. The lubricating seal of claim 18 wherein said second openings extend between said first opening and said apertures.

20. The lubricating seal according to claim 19 wherein said seal comprises at least four (4) fluid passages angularly spaced equally about said seal.

21. The lubricating seal according to claim 20 wherein said seal body further comprises a second lip portion extending from said heel portion to said first surface.

22. The lubricating seal according to claim 21 wherein said second lip portion extends generally parallel of said first surface and said second lip portion includes a first side in abutting relation of said first surface.

23. The lubricating seal according to claim 22 wherein said seal body is comprised of resilient rubber material having hardness of about 80 durometer.

24. The lubricating seal according to claim 23 wherein said lubricating material is grease having a viscosity of 900 SSU at 100° F. and said apertures range from about 0.010" to 0.060" in width.

* * * * *

UNITED STATES PATENT AND TRADEMARK OFFICE
CERTIFICATE OF CORRECTION

PATENT NO. : 5,169,160
DATED : December 8, 1992
INVENTOR(S) : William Gaskill, et al.

It is certified that error appears in the above—identified patent and that said Letters Patent is hereby corrected as shown below:

Column 8, line 35 "mans" is changed to --means--.

Signed and Sealed this

Twenty-sixth Day of October, 1993

Attest:

BRUCE LEHMAN

Attesting Officer

Commissioner of Patents and Trademarks